C. HERENDEEN.
APPARATUS FOR TREATING FLOUR.
APPLICATION FILED JUNE 28, 1913.
1,073,986.
Patented Sept. 23, 1913.
3 SHEETS—SHEET 1.
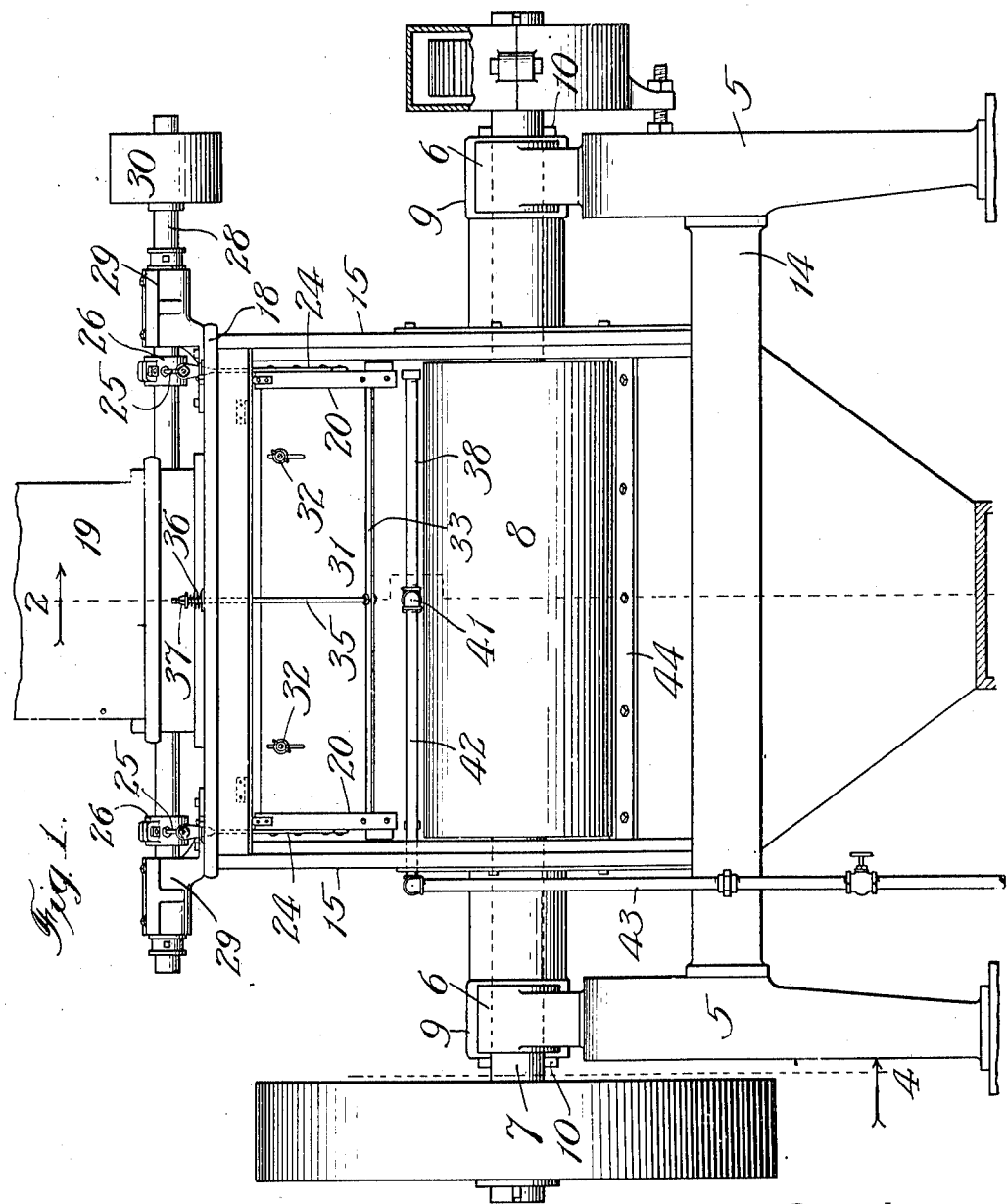
Witnesses:
W. A. Williams
Dudley Browne
Inventor.
Charles Herendeen.
by Browne & Phelps
Attorneys

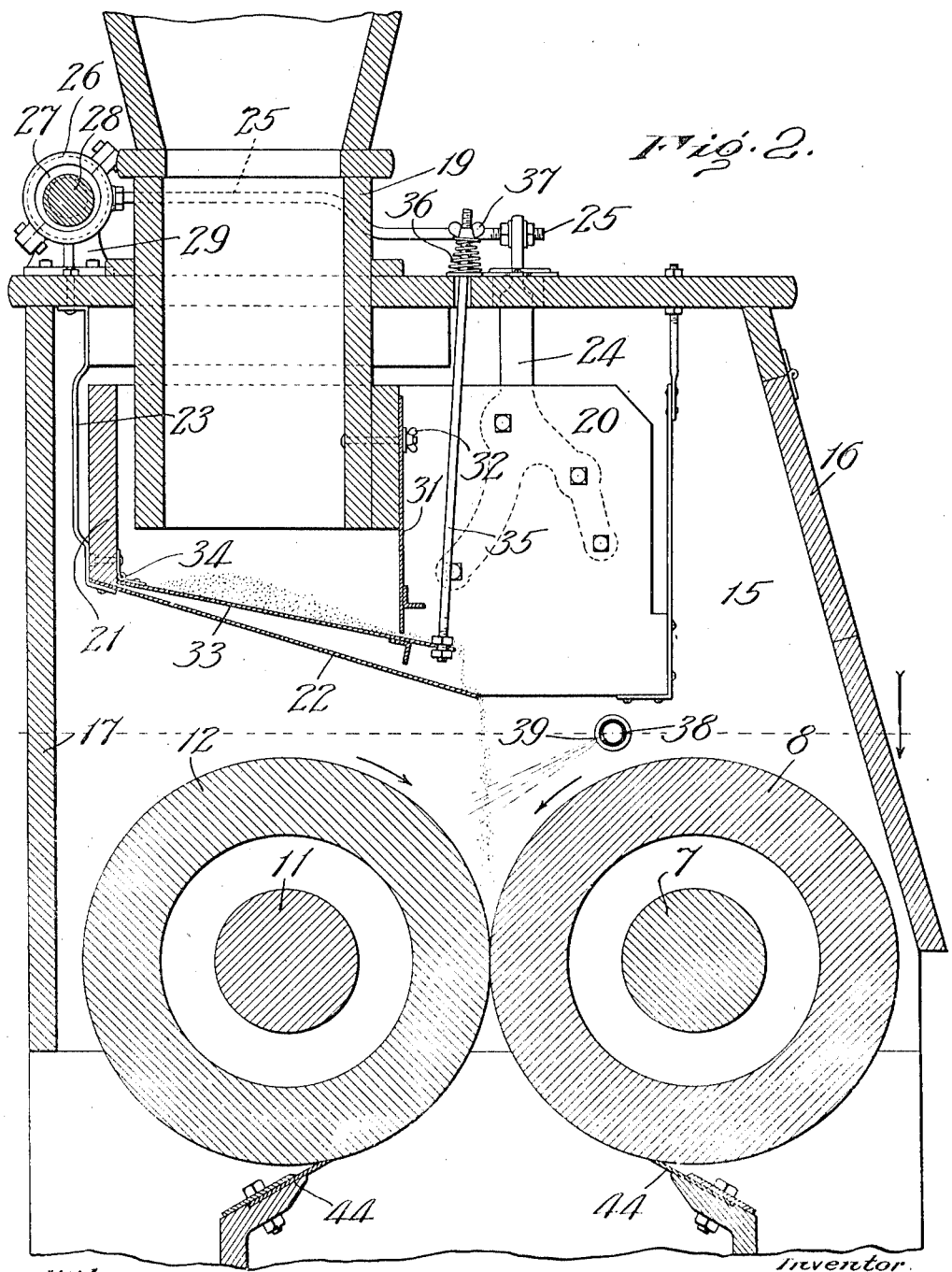

C. HERENDEEN.
APPARATUS FOR TREATING FLOUR.
APPLICATION FILED JUNE 28, 1913.
1,073,986.
Patented Sept. 23, 1913.
3 SHEETS—SHEET 3.
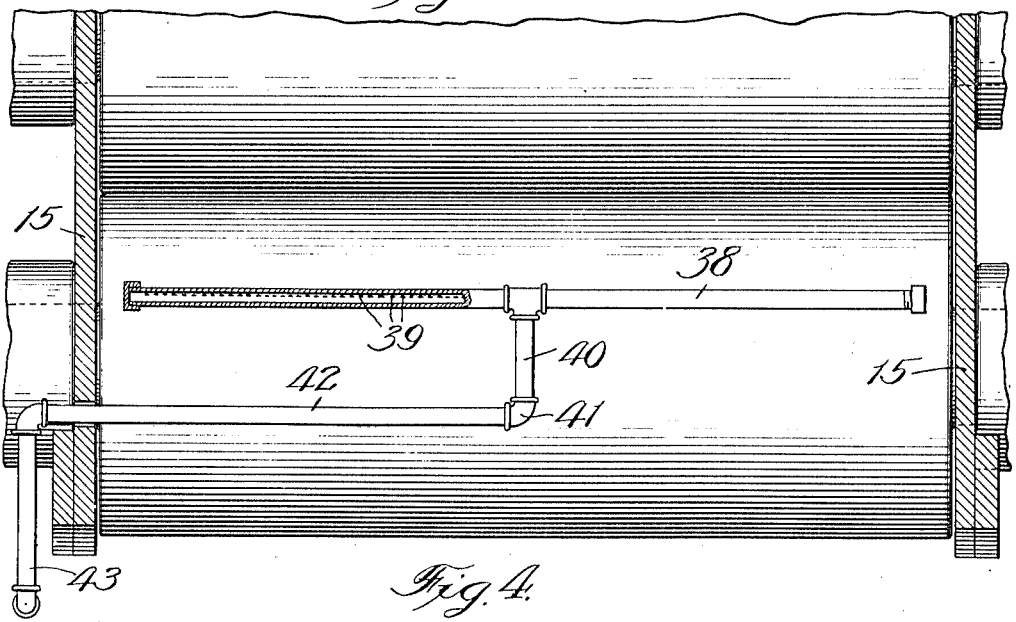
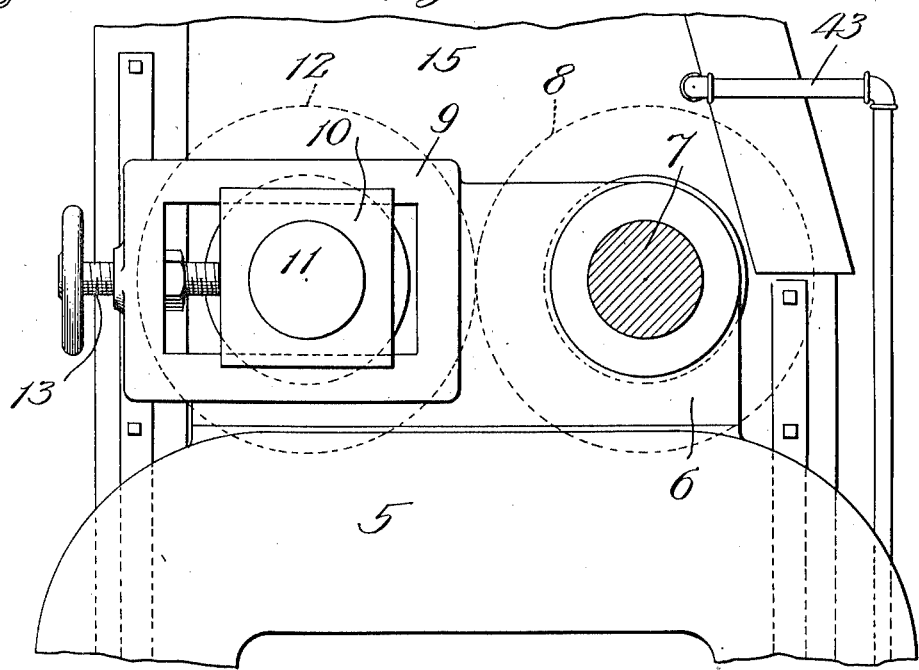
Witnesses:
Inventor
Charles Herendeen
by, Browne & Phelps
Attorneys

UNITED STATES PATENT OFFICE.

CHARLES HERENDEEN, OF CHICAGO, ILLINOIS.

APPARATUS FOR TREATING FLOUR.

1,073,986.

Specification of Letters Patent.

Patented Sept. 23, 1913.

Application filed June 28, 1913. Serial No. 776,306.

*To all whom it may concern:*

Be it known that I, CHARLES HERENDEEN, a citizen of the United States, residing at Chicago, in the county of Cook and State of Illinois, have invented a new and useful Apparatus for Treating Flour, of which the following is a specification.

My invention relates to a machine for the treatment of flour by means of which ordinary commercial flour, whether made from wheat, rye or other cereal having a high starch content may be so treated as to disrupt the starch cells therein, whereby the nutritive value of the flour will be increased, due to the fact that it is easier to digest, besides giving it a greater capacity for absorbing moisture than ordinary flour possesses, whereby bread, pastry and other food products made from such flour will remain fresh for a longer time than those made from flour which has not been so treated.

With the foregoing and other objects in view my invention consists broadly in causing the flour in a finely divided condition to be temporarily suspended in the atmosphere, and while suspended, providing a means for injecting steam thereinto and thereafter heating the flour, whereby the starch cells in the particles of flour will be exploded.

My invention further consists in providing a mechanism for separating the flour into particles and dropping it in the form of a shower between a pair of flaking rolls, which are heated in any desired way to the necessary temperature, the shower, just before it passes into the rolls, being subjected to jets of steam.

My invention further consists in certain constructions, combinations and arrangements of parts, the preferred form of which will be first described in connection with the accompanying drawings, and then the invention particularly pointed out in the appended claims.

Referring to the drawings herein designated, Figure 1 is a front elevation of machine embodying my invention; Fig. 2 is a central, vertical section taken on line 2 in Fig. 1 and looking in the direction of the arrow; Fig. 3 a section taken on line 3 of Fig. 2 and looking in the direction of the arrow and Fig. 4 is a section taken on line 4 of Fig. 1 and looking in the direction of the arrow.

5 designates a suitable supporting-frame provided in its upper portion with bearings 6 for the shaft 7 of one of the flaking rolls 8. I have also shown the upper portion of the frame as being provided with a yoke 7 in which is mounted a sliding journal-box 10 for the shaft 11 of the other flaking roll 12. 13 indicates a set-screw bearing against the box 10, whereby the roll 12 may be adjusted into the desired contact with roll 8. The particular construction of these parts forms no part of my invention, and may be varied or changed as desired.

Supported on the cross-bar 14 of the frame 5 are the side plates 15 of a box or casing, and 16 and 17 are the front and rear plates of said casing, the casing extending over and inclosing the flaking rolls 8 and 12, as best shown in Fig. 2. The box is also shown as provided with a top or cover 18 into which extends the pipe 19, through which the flour to be treated is fed. The pipe 19 fits into any ordinary or desired form of shaker which is adapted to separate the flour into particles and to deliver the same between the rolls 8 and 12 in the form of a finely divided shower. I have illustrated one form of well-known shaker, though the particular construction thereof forms no part of my invention. The shaker shown comprises side plates 20, a rear plate 21 and an inclined bottom plate 22. This shaker is supported at its rear by a spring arm 23 connected to the back plate 21 at one end, and to the under side of the top 18 at the other. Secured to the side plates 20 are brackets 24, which extend up through openings in cover and are connected to rods 25, connected to eccentric straps 26, surrounding eccentrics 27, mounted on a shaft 28, supported in suitable bearings 29 on the cover 18. I have also shown the shaft 28 as provided with a pulley 30 for driving the same.

I have illustrated a plate 31 adjustably mounted on the front of the pipe 19 by the set-screws 32; the lower end of the plate extending down below the mouth of the pipe.

33 is a plate hinged at 34 to the rear plate 21 of the casing, said plate extending forwardly and its front end being supported by a rod 35 extending upwardly through the top 18, the upper end of the rod being surrounded by the coil-spring 36, over which is adjustably secured the thumb-nut 37.

The just described mechanism is a form of shaker well-known in the art, and it will be seen that flour dumped into the tube 19 will pass out onto the plate 33, thence beneath the lower edge of the plate 31 onto the incline shaker plate 22 and from thence in a fine shower down between the flaking rolls 8 and 12.

My invention consists in locating a steam-pipe 38 perforated on one side with a line of perforations 39 in such a position as to inject a line of steam the length of the shower of flour into the shower just before the flour passes between the flaking rolls 8 and 12. The flaking rolls 8 and 12 may be heated to a temperature sufficient to thoroughly dry the flour passing between them by any desired means. I have found, however, that for some reason, not necessary to be stated, that when the rolls are jacked together very tightly, as is necessary, that sufficient heat is generated in the rolls and a sufficiently high temperature maintained to produce the necessary effects. The effect of injecting the steam into the falling shower of flour and then immediately passing the flour between these tightly pressed heated rolls is not only to dry out the flour, but to produce the result I desire, namely, to disrupt the starch cells in each particle of the flour.

I have shown the pipe 38 as extending out from a pipe 40 connected to the central portion of the pipe 38, and the pipe 40 being connected by an elbow 41 to a length of pipe 32, extending parallel to the pipe 38 and through the side 15 of the box, and then connected by pipe 43 to a suitable source of steam supply. It will also be noted, that with the pipe arranged as shown, that the openings 39 therein cause the steam therein to be directed into the shower of flour in a downward diagonal direction. This, however, can be changed as desired. I have also illustrated a pair of scrapers 44 which are attached to scrape the flaked flour from the rolls 8 and 12.

The flour, after it has been subjected to the steam and passed through the heated flaking rolls comes out in very thin sheets or flakes. These sheets can be collected in any suitable or desired way and then subjected to the full roller process, whereby they will be ground into flour of the original fineness; but said flour has its starch-cells disrupted and consequently when bread, pastry or the like is made therefrom, the said food will be more readily digestible, and because the flour with the disrupted starch-cells will absorb a greater amount of moisture than ordinary flour, the amount of moisture in the bread or pastry can be increased and thus the time which said bread or pastry can be kept without becoming stale is lengthened.

I realize that many variations are possible in the details of the present construction, without departing from the spirit of my invention, and, by having described the one embodiment thereof in detail, I do not intend to be limited thereto, except as pointed out in the following claims, in which it is my intention to set forth all the novelty inherent in the construction set forth in my invention.

What I claim as new and desire to secure by Letters Patent is:—

1. In a machine for treating flour, the combination with means for separating the flour into its particles, of means for subjecting the flour while in this condition to the action of heat and moisture, and means for thereafter applying pressure to the flour.

2. In a machine for treating flour, the combination with means for separating the flour into its particles, of means for subjecting the flour while in this condition to the action of steam, and means for thereafter applying pressure to the flour.

3. In a machine for treating flour, the combination with means for temporarily suspending the same in a finely divided condition, of means for subjecting the flour while in this condition to the action of heat and moisture, and means for thereafter applying pressure to the flour.

4. In a machine for treating flour, the combination with means for temporarily suspending the same in a finely divided condition, of means for subjecting the flour while in this condition to the action of steam, and means for thereafter applying pressure to the flour.

5. In a machine for treating flour, the combination with means for temporarily suspending the flour, in a finely divided condition in the atmosphere, means for injecting steam into the suspended particles, and mean for immediately thereafter heating the same and applying pressure thereto.

6. In a machine for treating flour, the combination, with means to cause the flour to fall in a finely divided shower, a means for injecting steam into the shower and means for immediately thereafter heating the same and applying pressure thereto.

7. In a machine for treating flour, the combination, with means for finely dividing the flour and causing it to fall in a finely divided shower, a means for injecting steam into the falling shower and means for immediately thereafter heating the same and applying pressure thereto.

8. In a machine for treating flour, the combination, with shaker mechanism adapted to cause the flour to fall in a finely divided shower, a pair of tightly pressed rolls between which the flour falls, the rolls being maintained at a suitable heat to disrupt the starch-cells and dry the flour, and means for injecting steam into the falling shower.

In testimony whereof I have hereunto set my hand.

CHARLES HERENDEEN.

In presence of two subscribing witnesses:
FRANCIS M. PHELPS,
GEORGE J. IRVINE.